July 27, 1948. H. E. WELLS 2,446,149
AIRCRAFT CONTROL SYSTEM
Filed June 18, 1947 2 Sheets-Sheet 2
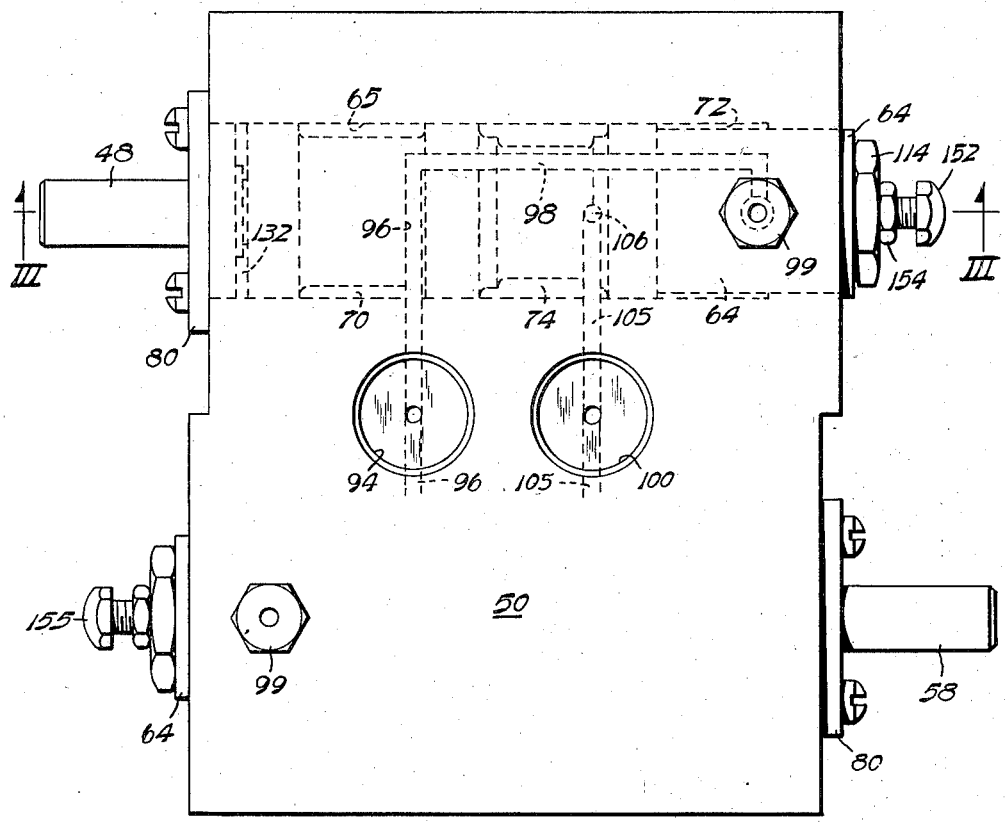
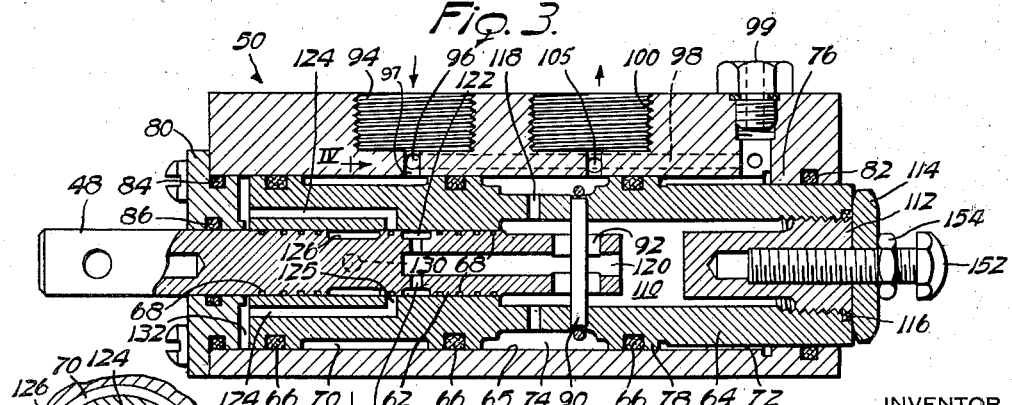
INVENTOR.
Harold E. Wells
BY Beau, Brooks, Buckley + Beau.
ATTORNEYS.

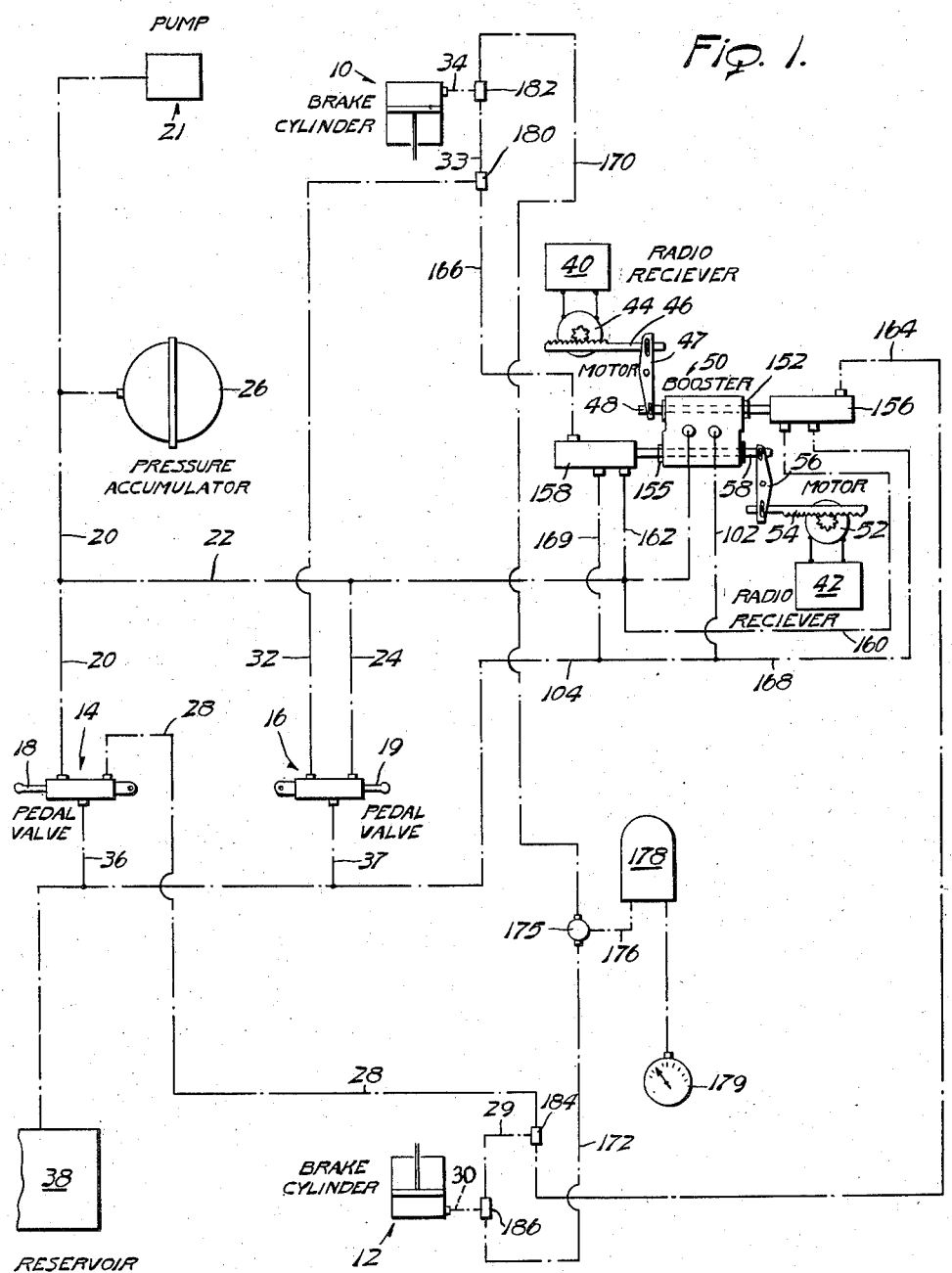

Patented July 27, 1948

2,446,149

UNITED STATES PATENT OFFICE 2,446,149

AIRCRAFT CONTROL SYSTEM

Harold E. Wells, Kenmore, N. Y., assignor to Bell Aircraft Corporation, Wheatfield, N. Y.

Application June 18, 1947, Serial No. 755,396

5 Claims. (Cl. 60—97)

This invention relates to aircraft, and more particularly to improvements in aircraft flight and taxiing control means embodying, in combination, passenger-pilot control and remote pilot control and emergency control mechanisms.

One of the objects of the present invention is to provide an aircraft unitary control system of improved form whereby an aircraft may be primarily controlled by either passenger-pilot actuated or remote pilot actuated means; and whereby upon misfunctioning of either of the primary control phases of the system, control of the aircraft may be taken over by means of an emergency over-control phase of the system.

Another object of the invention is to provide in aircraft control systems improved control power boosting means, whereby relatively low-power control impulses are automatically boosted in improved manner to relatively high-power impulses so as to insure effective aircraft control.

Another object of the invention is to provide an improved aircraft control system as aforesaid, which incorporates novel hydraulic power boost control mechanisms.

Other objects and advantages of the invention will appear in the specification hereinafter.

In the drawing Fig. 1 is a fragmentary, schematic illustration of a typical application of the invention to the landing wheel brake elements of an airplane, arranged for differential applications of braking effects on wheels at opposite sides of the airplane for ground steering control purposes.

Fig. 2 is a plan view, on an enlarged scale, of a hydraulic power boost mechanism of the control system;

Fig. 3 is a section taken along line III—III of Fig. 2; and

Fig. 4 is a fragmentary section along line IV—IV of Fig. 3.

Whereas the drawings illustrate application of the invention only to the ground wheel brake control devices on an airplane, it is to be understood that the power output impulses of the control system of the invention may be with equal facility transmitted to the aileron or flap or elevator or rudder or engine control elements in an airplane; or to adjustable shutter or other accessory devices thereon. However, in order to avoid undue complexity and duplication of description in the specification hereinafter, the drawings and the detailed description thereof is limited herein by way of exemplification of the invention to a specific application thereof to an aircraft landing wheel braking installation.

In Fig. 1 of the drawing the airplane landing wheel brake control system is illustrated to include a pair of power applying cylinder-piston units adapted to be connected to the brake applying mechanisms of corresponding landing wheels located at opposite sides of the airplane; the cylinder-piston units being designated in the drawing at 10 and 12. A passenger-pilot brake control arrangement is illustrated as being provided in the form of a pair of hydraulic control valves designated 14—16; the plunger devices 18—19 of which are adapted to be connected to corresponding pedal devices mounted in the aircraft pilot compartment. It is arranged that selective pilot-actuation of the connected pedal devices will result in corresponding applications of braking forces through the cylinder-piston units 10—12, and to this end the pressured fluid intake port of the valve 14 is connected to a conduit 20 which leads as indicated at 21 into connection with the output port of the pressured fluid supply pump of the system. The pressured fluid intake port of the pedal valve 16 is similarly connected into the pump output line by means of interconnecting conduits 22—24; and preferably, a pressure accumulator 26 is connected into the line of the conduit 20 to assist in maintaining substantially uniform pressures in the system.

The pressured fluid outlet port of the valve 14 is connected through means of conduits 28—29—30 into open communication with the pressured fluid intake port of the brake cylinder 12, while the pressured fluid outlet port of the valve 16 is connected through means of conduits 32—33—34 into open communication with the pressured fluid intake port of the brake cylinder 10. It will be understood that the plunger devices 18—19 of the valves 14—16 are of the longitudinally displaceable type, whereby to control passage of pressured fluid through the cores of the valves from the intake to the outlet ports thereof; and that, as is customary in the hydraulic valve control art, the fluid drainage ports of the valves 14—16 will be connected by means of conduits 36—37, respectively, into the main fluid reservoir 38 of the system. Thus, it will be appreciated that the valve plungers 18—19 are arranged so as to be selectively actuated in response to pedal operations by the airplane passenger-pilot, whereupon corresponding operations of the brake control cylinders 10—12 will be effectuated; and that the brakes at opposite wheels of the airplane may be either simultaneously and equally applied for straight line braking effects, or differentially applied for taxiing steering control.

To provide for remote control operation of the airplane, as through means of radio impulse sending apparatus located in another airplane or in a sea vessel or at a ground station; the controlled airplane system is illustrated in Fig. 1 to include a pair of radio receivers designated 40—42. It will be understood that these receivers 40—42 may be of any suitable type such as are adapted to receive radio impulses from corresponding radio sending sets carried by the "mother" airplane or other controlling station and to convert said signals into amplified current impulses; the receivers 40—42 and their corresponding sending sets being differently tuned so as to be independently operable.

The receiver 40 is illustrated to be in electrical connection through suitable conductors with a servo-motor 44; the armature of the motor 44 being geared to a rack bar 46 which operates through lever 47 to displace a positioner or control element 48 of a hydraulic power boost unit which is designated generally at 50. The radio receiver 42 is likewise electrically connected to a motor 52 which is similarly geared to a rack 54 and through lever 56 to another positioner 58 embodied in another portion of the mechanism within the power boost unit casing 50.

As illustrated in Figs. 1-2, the power boost device 50 is in the form of a dual unit embodying within a single casing a pair of independent power boost mechanisms; one of the mechanisms being controlled by the positioner 48, and the other of the mechanisms being controlled by the positioner 58. Fig. 3 is a sectional view taken approximately along line III—III of Fig. 2 to illustrate the power boost mechanism associated with the positioner 48; and it is to be understood that another similar mechanism is also incorporated within the lower part of the casing 50 in association with the positioner 58.

As shown in Fig. 3, the positioner 48 comprises a cylindrical plunger which accurately fits in longitudinally slidable relation within a reduced bore portion 62 of a tubular-like piston 64. The piston 64 in turn accurately fits in longitudinally slidable relation within a suitably bored portion 65 of the casing 50. Pressure sealing rings are preferably carried by the piston as indicated at 66, and also sealing rings will be preferably carried by the plunger 48 as indicated at 68; whereby the relatively movable plunger and piston and casing surfaces will be sealed against leakages. The piston 64 is annularly grooved to provide therearound a fluid chamber 70 adjacent one end of the piston; a second fluid chamber 72 adjacent the other end of the piston; and a third fluid chamber 74 intermediately of the ends of the piston. The casing 50 is provided at the right-hand end of its bored portion with a reduced bore, thus providing a shoulder 76 which fits the reduced piston surface 64 and is adapted to receive the annular flange portion 78 of the piston (between the chambers 72—74) in abutting relation thereagainst whenever the piston is displaced to the right from the position thereof shown in Fig. 3; thereby limiting the extent of displacement of the piston to the right relative to the casing to prevent unintended disassembly of the mechanism. An annular gland 80 is bolted to the opposite end of the casing 50 to limit displacement of the piston 64 toward the left as viewed in Fig. 3; and the shoulder 76 is preferably pressure-sealed relative to the piston as at 82 while the gland 80 is pressure-sealed relative to the casing 50 and to the plunger 48 by means of devices 84—86. Displacements of the plunger 48 relative to the piston 64 are arranged to be limited by the provision of a pin 90 carried by the piston 64 to traverse the bore thereof; the plunger 48 being transversely bored as indicated at 92 to a greater dimension than the diameter of the pin 90, whereby the plunger 48 may shift longitudinally relative to the piston within the limits necessary for operation of the device as will be explained hereinafter.

The valve casing 50 is drilled and tapped as indicated at 94 to provide for connection thereat with the threaded end of the conduit 22 bringing fluid under pressure into the valve device. A passageway leads from the bore 94 through the casing at opposite directions therefrom as indicated at 96—96, and thence downwardly as indicated at 97 at its opposite ends into open communication with fluid chambers 70—70 formed by annularly grooving the pistons 64—64 (Fig. 2). The passageway 96 is also formed with an extension 98 leading into open communication with the chamber 72 encircling the right hand end of the piston 64. The terminal of the passageway 98 is plugged by means of a stud as indicated at 99.

The casing 50 is also drilled and tapped as indicated at 100 to receive in threaded connection thereat one end of a conduit 102 which in turn connects into an oil return conduit 104 leading back to the reservoir 38 (Fig. 1). The valve casing body 50 is formed interiorly thereof with passageways 105—105 leading in opposite directions from open communication with the bore 100 and thence downwardly at their opposite ends as indicated at 106 into open communication with the corresponding chambers 74 encircling the pistons 64.

The tubular pistons 64 are each formed with an enlarged bore 110 adjacent its right hand end portion as viewed in Fig. 3, and is closed at its right hand end by means of a screw plug 112 which is pressure-sealed to the piston body 64 by means of a lock nut 114 and a gasket 116. The piston body 64 is drilled as indicated at 118 to intercommunicate the chambers 74—110, and the plunger 48 is longitudinally bored at its right hand end as indicated at 120 and transversely bored as indicated at 121 to intercommunicate the left hand end of the bore 120 with a fluid chamber 122 formed by annularly grooving the plunger 48. The piston 64 is formed with longitudinally directed passageways 124 (Figs. 3-4) leading from the left hand end of the piston and opening into the piston bore at point 125. The plunger 48 is annularly grooved as indicated at 126 at a position spaced from the groove 122, and the fluid chambers 126—70 are arranged in connecting communication by means of lateral passageways 130 drilled through the piston 64 so as to avoid interferences with the passageways 124 therein.

Thus, each valve device of the unit 50 is arranged so that starting from an inactive position as shown in Fig. 3, if the plunger 48 be displaced for example toward the right by operation of one of the associated radio-motor units 40—44 (Fig. 1) the annular grooved portion 126 in the surface of the plunger 48 will be thereby moved so as to interconnect the passageways 124 and the passageways 130. Thus, the fluid under pressure from the port 94 will be permitted to pass through the passageways 96—70—130—126—124 and thence into the fluid chamber 132 which is behind the piston 64. The action of the fluid pressure forces against the left hand end of the piston 64 will then force the latter to move toward the right, thereby applying the fluid pressure forces of the system to operate the primary control valve devices of the system, as will be explained hereinafter. Incidental to pilot displacement of the plunger 48 toward the right as viewed in Fig. 3 and prior to responsive movement of the piston 64 as explained hereinabove, the fluid within the chamber 110 may escape through the passageways 118—74—106—105 and thence through the port 100 into the return line of the system.

It is a particular feature of the valve device of the invention that although the pilot-actuated plunger is movable within the piston 64 in response to applications of only very small operating forces thereon, the plunger at all times senses the fluid pressure forces of the return conduit system, and therefore gives the pilot device an appropriate "feel" of the control system. To procure later reverse direction movement of the piston 64, the plunger 48 is pilot-displaced toward the left, whereupon communication between the inlet port 94 and the passageways 124 and the chamber 126 will be severed, while the passageway 122 will be brought into communication with the passageways 124 so as to interconnect the later with the outlet port 100 through the passageways 120—118—74—104. At the same time, the pressured inlet fluid passageway 98 will be conducting pressured fluid into the chamber 72 encircling the right hand end of the piston 64 so as to press against the abutment 78 of the piston thereby biasing the latter toward the left relative to the casing.

It will be understood of course that the fluid pressures of the system and the relative areas of the pressure-responsive end portions of the piston and the plunger will be so selected and dimensioned as to provide the desired differential operation so that when the plunger is displaced to the right the fluid pressures behind the left end of the piston will readily overcome the fluid pressures applying against the shoulder 78 of the piston so that the piston will move to the right; and that when the plunger is displaced to the left the fluid pressures against the shoulders 78 will provide a corresponding actuation of the piston toward the left.

The piston 64 is arranged, as shown in Figs. 2–3, to move forcibly to the right so as to press against the movable element of a control valve device, as will be explained hereinafter; and as illustrated in Figs. 2–3, the piston 64 may include an adjustable push head 152 which is in the form of a stud screwed into the plug 112 and locked thereon by means of a nut 154 for adjustable contact with the movable element of the valve to be actuated. Thus, it will be appreciated that the boost valve unit 50 embodies a pair of boost valve devices having actuator plungers 48—58, respectively, and corresponding bias-heads 152—155 which are arranged as illustrated in Fig. 1 to actuate spring-biased movable elements of corresponding control valve devices 156—158.

The control valves 156—158 are of the pressure-throttling type, and the pressured fluid inlet ports thereof connect respectively through conduits 160—162 into the pressure supply conduit 22. The controlled fluid pressure outlet port of the valve 156 is connected through a conduit 164 into the pressure supply conduit 29 of the brake unit 12, and the controlled pressure outlet port of the valve 158 is connected through a conduit 166 to the pressure supply conduit 34 of the brake unit 10. The fluid return ports of the valves 156—158 are connected through conduits 168—169, respectively, into the return conduit 104 leading to the reservoir of the system. Thus, it is appreciated that upon operation of the radio-motor unit 40—44 the control valve 156 will be actuated so as to apply the wheel brake 12; and upon operation of the radio-motor unit 42—52 the control valve 158 will be actuated to cause the brake unit 10 to operate.

For emergency control purposes the aircraft control system includes, as shown in the drawing for example, means for permitting the aircraft brakes to be set in case of misfunctioning of either the passenger-pilot or remote controlled phases of the system, such as might occur as a result of gun fire damage to the conduits previously described. For this purpose in Fig. 1 of the drawing an emergency brake control system is illustrated to comprise a pair of air lines or conduits 170—172 leading respectively from connections to the brake cylinders 10—12 into a common connection with an air pressure control valve 175. The valve 175 is in series with a conduit 176 which connects into a compressed air reservoir or "bottle" 178; whereby upon opening of the valve 175 the pressure within the bottle 178 will be released against the air in the conduits 170—172 to cause the latter to pneumatically operate the cylinder-piston units 10—12 for setting the airplane brakes. Preferably, an air pressure gauge 179 will be arranged in connection with the compressed air bottle to keep the passenger-pilot informed as to the pressure on the system.

It is contemplated that the control valve 175 will be arranged to be operated manually by the passenger-pilot such as by means of any suitable mechanical connection to a conveniently positioned pilot control device. Also, it is contemplated that the control valve 175 will be arranged to be actuated from a remote control station, such as referred to hereinabove; and therefore it will be understood that a suitable radio receiver (not shown) may be connected to the valve 175, such as has been explained hereinabove in connection with the radio actuated remote control system. Thus, in event of failure of either of the primary control systems, the emergency valve 175 may be actuated either from within the airplane or from the ground to cause the aircraft brakes to be applied.

To provide for actuation of the brake unit 10 either by operation of the pedal valve 16 or the remotely controlled valve 158, alternatively, a shuttle valve 180 is provided at the point of juncture between the conduits 32—33—166; and a similar shuttle valve 182 is provided at the juncture of the conduits 33—34—170. A suitable type shuttle valve 184 is provided at the juncture of the conduits 28—29—164, and a similar shuttle valve 186 is provided at the juncture of the conduits 29—30—172. The shuttle valve devices 180—182—184—186 may be of the type disclosed in my co-pending U. S. patent application Serial No. 751,825, filed June 2, 1947; or in lieu thereof may be of any other suitable form such as to be adapted to respond to pressure differences within the incoming conduits so as to automatically connect the brake units with the conduits under the highest fluid pressures.

For example, the shuttle valve devices may comprise longitudinally displaceable piston members which are normally biased by spring means or the like in one direction, so as to intercommunicate the corresponding brake inlet conduit with the pedal valve conduits 28—32; but in event that the pedal valve conduits or other connected operating elements become disabled as by gun fire or the like so that the fluid pressures fall within the conduits 28—32; then immediately upon operation of the boost valve unit 50, as explained hereinabove, the shuttle valves 180—184 will operate automatically to interconnect the brake units 10—12 with the control valves 158—156. Furthermore, in event that the radiomotor boost control valve system and/or the conduits leading therefrom become disabled as by gun fire or the like, then upon operation of the compressed air control valve 175 the shuttle valve devices 182—186 will operate automatically to disconnect the damaged portions of the control system from the brake units while connecting the compressed air supply conduits 170—172 into communication with the brake units 10—12, thereby causing the brakes to be applied.

I claim:

1. In an aircraft, a hydraulic actuation device, a hydraulic pressure supply, a first conduit leading from said supply to said actuation device, a passenger-pilot operable control device in the line of said conduit, a second conduit leading from said supply to said actuation device, a remote-pilot operable control device in the line of said second conduit, a second pressure supply, a third conduit leading from said second pressure supply to said actuation device, a pilot operable control element in the line of said third conduit, and shuttle valve means at the junctures of said first and second and third conduits with said actuation device, said shuttle valve means being automatically operable in response to pressure differences within said conduits to selectively communicate only the conduit which is under the highest fluid pressure with said actuation device under all operating conditions.

2. In an aircraft, an aircraft hydraulic actuation device, a hydraulic pressure supply, a first conduit leading from said supply to said actuation device, a passenger-pilot operable control device in the line of said conduit, a second conduit leading from said supply to said actuation device, a remote-pilot operable control element in the line of said second conduit, a second pressure supply, a third conduit leading from said second pressure supply to said actuation device, a pilot operable control element in the line of said third conduit, and shuttle valve means at the junctures of said first and second and third conduits with said actuation device, said shuttle valve means being automatically operable in response to pressure differences within said conduits to selectively communicate only the conduit which is under the highest pressure with said actuation device under all operating conditions, said remote-pilot control element comprising a radio impulse receiver-amplifier, a servo-motor operable by the output of said radio amplifier, and a pilot-actuated hydraulic valve device coupled to said motor for pilot-actuation thereof, said valve device being in the line of said second conduit to control pressure forces transmitted therethrough to said actuation device.

3. In an aircraft, a hydraulic actuation device, a first hydraulic pressure supply, a first conduit leading from said first supply to said actuation device, a passenger-pilot operable control device in the line of said first conduit, a second conduit leading from said first supply to said actuation device, a remote-pilot operable control device in the line of said second conduit, a second pressure supply, a third conduit leading from said second pressure supply to said actuation device, a pilot operable control element in the line of said third conduit, and shuttle valve means in the lines of said conduits, said shuttle valve means being operable automatically in response to pressure differences within said conduits to communicate the conduit which is under the highest fluid pressure with said actuation device and to close off the others of said conduits.

4. In an aircraft, an aircraft hydraulic actuation device, a hydraulic pressure supply, a first conduit leading from said supply to said actuation device, a passenger-pilot operable control device in the line of said conduit, a second conduit leading from said supply to said actuation device, a remote-pilot operable control element in the line of said second conduit, and shuttle valve means at the junctures of said first and second conduits with said actuation device, said shuttle valve means being automatically operable in response to pressure differences within said conduits to selectively communicate only the conduit which is under the highest pressure with said actuation device under all operating conditions, said remote-pilot control element comprising a radio impulse receiver-amplifier and a servo-motor operable by the output of said radio amplifier and a pilot-actuated hydraulic valve device coupled to said motor of pilot-actuation thereof, said valve device being in the line of said second conduit to control pressure forces transmitted therethrough to said actuation device.

5. In an aircraft, an aircraft hydraulic actuation device, a hydraulic pressure supply, a first conduit leading from said supply to said actuation device, a passenger-pilot operable control device in the line of said conduit, a second conduit leading from said supply to said actuation device, a remote-pilot operable control element in the line of said second conduit, and shuttle valve means at the junctures of said first and second conduits with said actuation device, said shuttle valve means being automatically operable in response to pressure differences within said conduits to selectively communicate only the conduit which is under the highest pressure with said actuation device under all operating conditions, said remote-pilot control element comprising an impulse receiver-amplifier, a servo-motor operable by the output of said amplifier, and a hydraulic valve device coupled to said motor for actuation thereof, said valve device being in the line of said second conduit to control pressure forces transmitted therethrough to said actuation device.

HAROLD E. WELLS.

REFERENCES CITED

The following references are of record in the file of this patent:

UNITED STATES PATENTS

| Number | Name | Date |
| --- | --- | --- |
| 2,186,235 | Brown | Jan. 9, 1940 |
| 2,349,804 | Sorensen | May 30, 1944 |
| 2,396,984 | Brodston et al. | Mar. 19, 1946 |
| 2,411,705 | Benjamin | Nov. 26, 1946 |